April 6, 1954     B. HAYDEN     2,674,059
ARTIFICIAL BAIT
Filed March 26, 1948
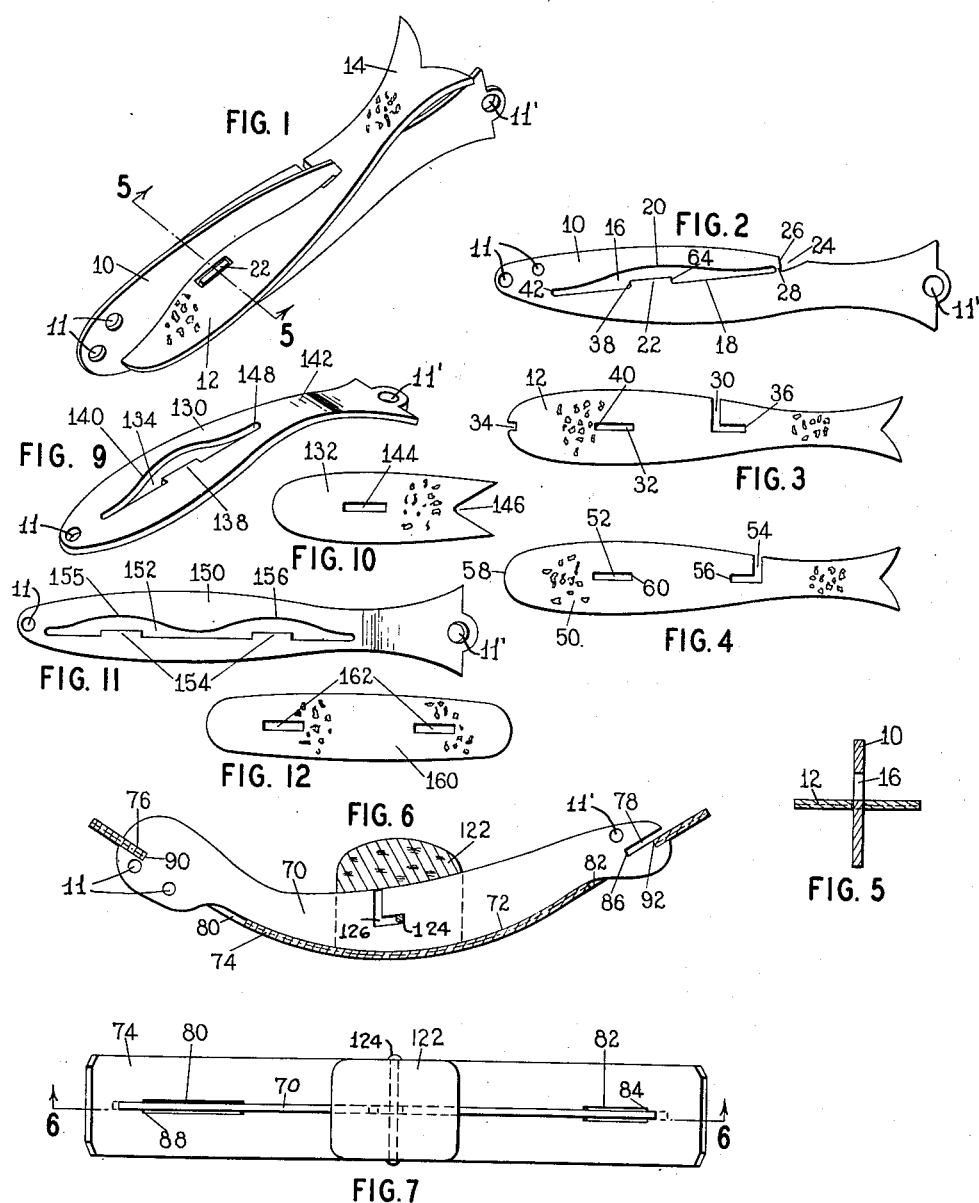
INVENTOR
BOYD HAYDEN
by Wright, Brown,
Quinby & May ATTYS Patented Apr. 6, 1954

2,674,059

UNITED STATES PATENT OFFICE 2,674,059

ARTIFICIAL BAIT

Boyd Hayden, Newtonville, Mass.

Application March 26, 1948, Serial No. 17,191

3 Claims. (Cl. 43—42.09)

This invention relates to artificial bait adapted for use in casting and trolling for fish. It is an object of the invention to provide an artificial bait or lure having a portion which is detachable and replaceable so that the appearance of the bait can be readily changed. According to the invention, a rigid, plane member is provided, preferably of metal. This member has one or two longitudinally extending slots therein adapted to receive and hold a stiffly resilient member which is preferably of a waterproof, plastic material such as a synthetic resin. Either or both of these members may preferably, but not necessarily, have a contour resembling a minnow. The flexible member may be supplied in a variety of colors or color combinations, any one of which can be selected to be joined to the rigid member. The assembled members are shaped so as to interlock and thus to prevent accidental detachment of the flexible member when the bait is in use.

For a more complete understanding of the invention, reference may be had to the following description thereof, and to the drawing, of which—

Figure 1 is a perspective view of an artificial bait embodying the invention;

Figures 2 and 3 are elevational views of the parts of the bait shown in Figure 1;

Figure 4 is an elevation of a modified part;

Figure 5 is a sectional view taken on the line 5—5 of Figure 1;

Figure 6 is a sectional view taken on the line 6—6 of Figure 7;

Figure 7 is a bottom plan view of a modified form of the invention;

Figure 8 is a sectional view of another modification;

Figure 9 is a perspective view of one member of another modified form of the invention;

Figure 10 is an elevation of a member to be assembled with that shown in Figure 9;

Figure 11 is a plan view of a member of another modification; and

Figure 12 is an elevation of a member to be assembled with that shown in Figure 11.

The drawing illustrates a number of embodiments of the invention, each of which consists of two elongated members of sheet material, one of which is preferably rigid, the other being stiffly resilient.

In the embodiment illustrated in Figures 1, 2 and 3, the rigid member 10 is preferably of metal, such as brass, and may be cut out in the approximate shape of a minnow. The stiffly resilient member 12 may be also in the shape of a minnow, and may consist of suitable waterproof material or materials such as a synthetic resin. The resilient member 12 is, for convenience, hereinafter referred to as the plastic member since it is preferably made of plastic sheet material, though it is to be understood that other resilient materials may be used, such as spring sheet metal, for example. In order to attract the attention of fish, the members 10 and 12 of the lure may be brightly finished. For this purpose, the metal member 10 may be plated with nickel or chromium, and polished. Holes 11 are provided in the forward end of the metal member for attaching a line or leader. A hole 11' is in the tail end for attaching a fish-hook. The plastic member 12 may be furnished in a variety of colors, or combinations of colors, which can be selectively employed in conjunction with the metal member. One desirable material for the plastic member 12 is a laminated, synthetic resin sheet having a central layer of bits of foil or other bright reflecting material which causes a scintillating reflection of light from either surface of the sheet. The members 10 and 12 are designed for quick and easy assembling and disassemblying, the members being firmly locked together when assembled.

As indicated in Figures 1 and 5, the plastic member is arranged with respect to the metal member 10 in such a manner that it is substantially bisected by the plane of the metal member, and transverse lines on the plastic member 12 are perpendicular to the plane of the metal member 10.

In the form of the invention shown in Figure 1, the forward portion of the plastic member 12 is substantially plane, its plane being perpendicular to the plane of the metal member 10, but the tail portion 14 may be curved upward so as to cause an undulating or flopping movement of the lure when it is drawn through water. The metal member 10 is provided with an elongated slot 16 which tapers in width from its midportion toward its ends. This slot extends longitudinally with respect to the metal member and has one substantially straight side 18, the mid-portion of the opposite side 20 being convexly curved to widen this portion of the slot. A lug 22 projects from the straight side 18 toward the opposite side 20, the slot being wide enough at the lug to provide sufficient clearance between it and the opposite side 20. The purpose of the slot 16 is to receive a portion of the plastic member 12 which may be inserted edgewise therein until its median is within the slot. The outside contour of the metal member 10 is notched, as at 24, to form a shoulder 26, which is in line with the slot 16. Between the rear end of the slot 16 and the shoulder 26 is a narrow neck 28. When the members are to be assembled, the plastic member 12 is presented to the metal member 10 with its plane perpendicular to the plane of the metal member. The two members are moved together so that the neck 28 enters a bayonet slot 30 in the plastic member 12. The inner portion of this slot is on the median line of the plastic member 12. Also on the median line is a slot 32 which is long enough to receive the lug 22 of the metal member.

In the form of the member 12 shown in Figure 3, a short slot 34 extends inward from the forward end of the member, this slot also being on the median line of the member. When the members have been moved together so that the neck 28 moves to the end of the transverse portion of the bayonet slot 30, the member 12 is then swung about the neck 28 as a pivot until the portion of the member 12 forward of the slot 30 has entered the slot 16 far enough to bring the median line into the plane of the metal member. In order to swing the plastic member 12 into such position, it is necessary to spring or bow the forward portion thereof sufficiently to clear the lug 22. When the plastic member is swung into the position mentioned, the slot 32 does not register with the lug 22 since it is offset therefrom rearwardly. The plastic member 12 is then pushed forward, the neck 28 thus being moved down the longitudinal portion of the bayonet slot 30 until it engages the rear end wall 36 of the bayonet slot. This brings the slot 32 into register with the lug 22, whereupon the resilience of the sprung member 12 causes its forward portion to assume its normal plane shape and to engage against the straight edge 18 of the slot 16, and the lug 22 enters the slot 32. The members are locked together by the interengagement of surface elements on sides and ends of the slots in the members as follows. The forward end of the lug, which constitutes a shoulder 38, engages against the forward end wall 40 of the slot 32 and thus prevents rearward movement of the plastic member 12 relative to the metal member 10. Since the rear end 36 of the bayonet slot 30 engages the edge 26 in the notch 24 to prevent further forward movement of the member 12 relative to the member 10, the member 12 is thus locked against any longitudinal movement relative to the metal member 10. Furthermore, lateral movement of the member 12 relative to the member 10 is prevented at three points, by the engagement of the neck 28 with the sides of the slot 30 adjacent to the rear wall 36, by the engagement of the sides of the slot 32 with the sides of the lug 22, and by the engagement of the metal adjacent to the forward end 42 of the slot 16 against the sides of the short slot 34 in the forward end of the member 12. The length of the member 12 is such that the slot 34 receives a portion of the member 10 when the member 12 is pushed forward to its normal assembled position. In order to disassemble the two members, it is first necessary to spring the forward portion of the plastic member upward until it clears the lug 22 so that the member 12 can be then pushed back to a point where it can be swung about the neck 28.

Figure 4 shows a modified shape of the plastic member 50. This member has no slot in its forward end but is provided with a central slot 52 and with a bayonet slot 54, the inner portion of which extends forward to an end 56. In order to assemble this plastic member with the metal member 10, the neck 28 is introduced into the slot 54 and is caused to advance to the forward end 56 of the slot. The plastic member 50 is then swung about the neck 58 as a pivot until the slot 52 registers with the lug 22 and snaps down over it, the slot 52 being spaced from the end 56 of the bayonet slot by a distance equal to that between the lug 22 and the neck 28. In this case, forward movement of the plastic member 50 with respect to the metal member 10 is prevented by engagement of the front end 58 of the plastic member against the end 42 of the slot 16 and also by the engagement of the rear slot 16 against the rear end of the slot 52 against the rear end 64 of the lug 22. Rearward movement of the plastic member 50 is prevented by engagement of the end 56 of the bayonet slot 54 against the neck 28 which is at the rear end of the slot 16, and by the lug 22 in the slot 52. Lateral movement of the plastic member is prevented by the engagement of the neck 28 in the bayonet slot 54 and by the engagement of the lug 22 in the slot 52. In order to disassemble the members, it is necessary first to press against the under face of the plastic member 50 so as to spring the forward portion clear of the lug 22, whereupon it can be swung laterally to move it out of the slot 16.

A modified form of the invention is shown in Figures 6 and 7, this form consisting of a rigid metal plate member 70, having one side edge with a convex arcuate portion 72 which extends for the greater part of the length of the member. Assembled with the member 70 is a stiffly resilient member 74 of sheet material such as a synthetic resin or the like. As in the case of the members shown in Figures 3 and 4, the member 74 is preferably of material which will give a scintillating reflection of light. The metal member 70 is provided with short slots 76 and 78 extending in from the respective ends thereof, these slots being approximately in line with the adjacent ends of the arcuate edge portion 72. The plastic member 74 is provided with two longitudinally extending slots 80 and 82 near its respective ends. In assembling the two members, the plastic member 74 is presented to the arcuate edge 72 with its plane perpendicular to the plane of the metal member 70. The right-hand end of the plastic member is slipped over the end of the metal member until the slot 82 registers with the slot 78. Thereupon, the plastic member 72 is moved longitudinally toward the left until the end wall 84 of the slot 82 engages the inner end wall 86 of the slot 78. The distance between the end wall 84 of the slot 82 and the end wall 88 of the slot 80 is such that when the plastic member has been moved to this position, the left-hand end of the plastic member can be bowed or sprung around the arcuate edge 72 until the slot 80 registers with the slot 76, the end 88 of the slot just clearing the end of the metal member 70. The plastic member 74 is then pushed toward the right until the end wall 88 of the slot 80 engages the inner end 90 of the slot 76. The slot 78 at the right-hand end of the metal member has a widened portion near its open end, forming a shoulder 92 in a side edge thereof. The distance between the shoulder 92 and the inner end 90 of the slot 76 measured along the arcuate edge 72, is equal to the distance between the end 88 of the slot 80 and the end 84 of the slot 82. Hence, when the plastic member is moved toward the right until the end of the slot 80 engages the end 90 of the slot 76, the end 84 of the slot 82 will spring over the shoulder 92 and will then be in engagement with that shoulder until released therefrom when the right-hand end of the plastic member is sprung upward against its natural resilience. Thus, the slots at the ends of the metal member and within the ends of the plastic member interlock to prevent lateral movement of the plastic member relative to the metal member. The engagement of the slot ends 84 and 88 with the shoulders 92 and 90 respectively prevents longitudinal movement of the plastic member relative to the metal member. Hence, the members are securely locked together until released by springing the right-hand end of the plastic member so as to clear the shoulder 92, and then shifting the plastic member to the left and right to disengage the end slots.

The form of lure shown in Figure 8 is similar to that shown in Figure 6 except that the locking shoulder is located at a point near the middle of the metal piece rather than near the right-hand end. As shown, the metal member 100 is provided with a convex arcuate edge portion 102 and end slots 104 and 106 which extend in from the ends of the metal member and are in line with the arc 102. The plastic member 110 has three aligned, longitudinal slots 112, 114 and 116 therein, spaced inward from the ends of the member. The arcuate edge 102 is interrupted by an upstanding lug 118 which has a shoulder 120. When the plastic member is applied to the metal member, the slot 116 is moved over the right-hand end of the metal member until this slot is in register with the slot 106. The plastic member is then moved toward the left until the left-hand end can be sprung about the end of the metal member to bring the slot 112 in register with the slot 104. The plastic member is then moved back toward the right until the slot 114 is entered by the lug 118, the shoulder 120 thereupon engaging one end of the slot 114 to lock the plastic member against movement toward the left. Further movement toward the right is prevented by the engagement of the end of the slot 112 with the inner end of the slot 104. The members can be readily disassembled by reversing the movements by which they were assembled.

Since the curvature of the member 74 or 110 may cause the lure to dive when it is drawn through water, a buoyant element 122 of cork, wood, or an equivalent may be detachably or permanently mounted on the metal member as for example by a transverse pin 124 in the buoyant member which passes through a hole or slot 126 in the metal member.

Figures 9 and 10 show the members of another modified form of the invention comprising a rigid member 130 of sheet metal or an equivalent and a stiffly resilient member 132 of plastic sheet material or the like. The forward portion of the member 130, which may be given a contour shape resembling a minnow, is plane and has a slot 134 therein somewhat similar to the slot 16 shown in Figure 2 in that one side 136 of the slot is straight with a lug 138 projecting therefrom toward the other side 140 of the slot, the latter being convexly curved opposite the lug 138 to provide sufficient clearance to receive the resilient member 132. As shown, the tail portion 142 of the rigid member 130 is curved to prevent the lure from surfacing when it is being drawn through the water. The resilient member 132 is plane and has a central slot 144 to fit over the lug 138. It may also have a notch 146 in its tail end. To assemble the members, the resilient member is longitudinally sprung and is introduced edgewise into the slot 134 tail first so that the notch 146 can receive the end 148 of the slot 134. When the slot 144 registers with the lug 138, the member 132 springs back to its usual plane shape as the lug 138 enters the slot 144. The member 132 is thus held in its assembled position by engagement of its end portions between the sides of the corresponding portions of the slot 134 and by engagement of the sides of the slot 144 with the ends and sides of the lug 138. The engagement of the notch 144 with the tail end 148 of the slot 138 also helps, but is not necessary. To disassemble the members, the resilient member is sprung until its mid-portion clears the lug 138. It is then removed edgewise from the slot 134.

Figures 11 and 12 show the members of another modification wherein the rigid member 150 has a slot 152 having a straight side with two lugs 154 projecting therefrom, the slot being widened opposite these lugs by convex curves 155, 156 in the opposite side, the end portions and mid-portion of the slot being slightly wider than the thickness of the resilient member 160 which is adapted to enter it edgewise when sprung to clear the lugs 154. The member 160 has two properly spaced slots 162 on its median adapted to receive the respective lugs 154 for an interlock therewith. The portion of the rigid member 150 containing the slot 152 is plane, but the tail portion of this member is preferably curved, the resilient member 160 being plane.

Various further modifications and changes may be made in the embodiments of the invention herein described without departing from the scope thereof as defined in the following claims.

I claim:

1. A fish lure comprising an elongated, substantially rigid member of sheet material having a longitudinally extending slot within its contour, said slot tapering in width from its mid-portion toward its ends and having a lug projecting from one edge thereof at the portion of maximum width, and a stiffly resilient member of sheet material having a portion adapted to be inserted edgewise in said slot to assemble the members, and having a slot on its longitudinal median adapted to engage over said lug to lock the members together when assembled.

2. A fish lure comprising a rigid member of sheet material having a contour shape resembling a minnow, a major portion of said member being plane with a tail portion curved out of the plane, said member having a slot in its plane portion with a lug projecting into the slot from one side edge thereof, said slot being widened opposite said lug, and a stiffly resilient plane member having a median slot adapted to fit over said lug, said resilient member being of sheet material having a thickness slightly less than the narrow portions of the slot in the rigid member.

3. A fish lure comprising an elongated, substantially rigid member of sheet material having a longitudinally extending slot within its contour, said slot tapering in width from its mid-portion toward its ends and having a lug projecting from one edge thereof at the portion of maximum width, and a stiffly resilient member of sheet material having a portion adapted to be inserted edgewise in said slot to assemble the members, and having a slot adapted to engage over said lug to lock the members together when assembled.

References Cited in the file of this patent

UNITED STATES PATENTS

| Number | Name | Date |
|---|---|---|
| 816,116 | Heddon | July 23, 1907 |
| 1,373,765 | Russell | Apr. 5, 1921 |
| 1,519,174 | Tomlin | Dec. 16, 1924 |
| 2,234,439 | Larson | Mar. 11, 1941 |
| 2,239,802 | Westby | Apr. 29, 1941 |
| 2,351,504 | Guillow | June 13, 1944 |
| 2,514,938 | Craig | July 11, 1950 |